US011356492B2

(12) United States Patent
Suto et al.

(10) Patent No.: US 11,356,492 B2
(45) Date of Patent: Jun. 7, 2022

(54) PREVENTING AUDIO DROPOUT

(71) Applicant: Kyndryl, Inc., New York, NY (US)

(72) Inventors: Tiberiu Suto, Franklin, NY (US);
Nadiya Kochura, Bolton, MA (US);
Vinod A. Valecha, Pune (IN)

(73) Assignee: Kyndryl, Inc., New York, NY (US)

( * ) Notice: Subject to any disclaimer, the term of this patent is extended or adjusted under 35 U.S.C. 154(b) by 69 days.

(21) Appl. No.: 17/022,429

(22) Filed: Sep. 16, 2020

(65) Prior Publication Data

US 2022/0086209 A1    Mar. 17, 2022

(51) Int. Cl.
| | |
|---|---|
| H04L 65/60 | (2022.01) |
| H04L 65/65 | (2022.01) |
| G10L 15/26 | (2006.01) |
| H04L 43/0829 | (2022.01) |
| H04L 49/90 | (2022.01) |
| H04L 65/80 | (2022.01) |

(52) U.S. Cl.
CPC ............ *H04L 65/601* (2013.01); *G10L 15/26* (2013.01); *H04L 43/0829* (2013.01); *H04L 49/9021* (2013.01); *H04L 65/608* (2013.01); *H04L 65/80* (2013.01)

(58) Field of Classification Search
CPC ............... H04L 65/601; H04L 43/0829; H04L 49/9021; H04L 65/608; H04L 65/80; G10L 15/26
See application file for complete search history.

(56) References Cited

U.S. PATENT DOCUMENTS

| | | | |
|---|---|---|---|
| 7,676,364 B2 * | 3/2010 | Rao .................. | G10L 15/08 704/235 |
| 7,873,064 B1 | 1/2011 | Li | |
| 8,160,112 B2 | 4/2012 | Shaffer | |
| 8,538,038 B1 | 9/2013 | Lester | |
| 9,100,539 B2 | 8/2015 | Sanso | |
| 9,401,938 B2 | 7/2016 | Bakaev | |
| 9,521,057 B2 | 12/2016 | Klingbeil | |
| 10,115,390 B2 | 10/2018 | Gopalakrishnan | |
| 2004/0267527 A1 * | 12/2004 | Creamer ............. | G10L 15/26 704/235 |

(Continued)

FOREIGN PATENT DOCUMENTS

| | | | | |
|---|---|---|---|---|
| EP | 3113180 A1 * | 1/2017 | ........... | G10L 19/005 |
| JP | 2000112931 A | 4/2000 | | |
| JP | 2007180828 A | 7/2007 | | |

OTHER PUBLICATIONS

"IPerf—The ultimate speed test tool for TCP, UDP and SCTP", Downloaded Sep. 9, 2020, 4 pages, <https://iperf.fr/>.

(Continued)

*Primary Examiner* — Mohamed A. Wasel
*Assistant Examiner* — Jihad K Boustany
(74) *Attorney, Agent, or Firm* — Ken Han, Esq.; Kevin P. Radigan, Esq.; Heslin Rothenberg Farley & Mesiti P.C.

(57) ABSTRACT

Embodiments of the present invention provide methods, computer program products, and systems. Embodiments of the present invention detect an audio stream comprising one or more voice packets from a first computing system. Embodiments of the present invention can, in response to detecting an audio stream, dynamically prevent audio drop out on a second computing system using circular buffers based on network consistency.

19 Claims, 8 Drawing Sheets

(56) References Cited

U.S. PATENT DOCUMENTS

| | | | |
|---|---|---|---|
| 2009/0112585 A1* | 4/2009 | Cox | G10L 15/02 |
| | | | 704/E15.001 |
| 2010/0198594 A1* | 8/2010 | Gangemi | G10L 13/00 |
| | | | 704/235 |
| 2018/0285312 A1* | 10/2018 | Liu | G06Q 10/101 |
| 2019/0035383 A1 | 1/2019 | Cutler | |
| 2019/0200368 A1* | 6/2019 | Omnes | H04W 72/087 |
| 2021/0183394 A1* | 6/2021 | Holmes | G10L 15/22 |

OTHER PUBLICATIONS

"Overdub", Uploaded Sep. 9, 2020, 2 pages, <https://www.descript.com/overdub?lyrebird=true>.

"Wave Editor", Free sound editor for Windows, Uploaded Sep. 9, 2020, 2 pages, <http://www.wave-editor.com/>.

Farrell At, "Improving Voice Recognition Accuracy", An IP.com Prior Art Database Technical Disclosure, IP.com No. IPCOM000123095D, IP.com Electronic Publication Date: Apr. 4, 2005, Original Publication Date: May 1, 1998, 3 pages.

Ishiguro, Satoshi, "Programmable Voice Recognition", An IP.com Prior Art Database Technical Disclosure, IP.com No. IPCOM000197481D, IP.com Electronic Publication Date: Jul. 12, 2010, Copyright: 2010, Sony Electronics Inc., 3 pages.

Disclosed Anonymously et al., "Routing Audio Output to Provide Inadvertently Muted Audio Output to a User", An IP.com Prior Art Database Technical Disclosure, IP.com No. IPCOM000252362D, IP.com Electronic Publication Date: Jan. 5, 2018, 36 pages.

* cited by examiner

PREVENTING AUDIO DROPOUT

BACKGROUND

The present invention relates in general to telecommunications networking and Internet of Things (IoT) devices and in particular to preventing audio dropout in real time.

In general, a conference call is a telephone call in which someone talks to several people at the same time. The conference call may be designed to allow the called party to participate during the call or set up so that the called party merely listens into the call and cannot speak. In other circumstances, features of the conference call can enable one or more members of the conference call to speak.

Some conference calls allow participants to call into the conference call themselves by dialing a telephone number that connects to a "conference bridge," which is a specialized type of equipment that links telephone lines. Service providers maintaining the conference bridge can provide the phone numbers and PIN codes that participants can enter to access the meeting or conference call. These service providers can often dial-out to participants, connecting them to call. Some services allow operators to moderate question and answer details and also enable and disable advanced conferencing features such as muting lines, muting participants and enabling a recording feature.

SUMMARY

According to an aspect of the present invention, there is provided a computer-implemented method. The method comprises detecting an audio stream comprising one or more voice packets from a first computing system; and in response to detecting an audio stream, dynamically preventing audio drop out on a second computing system using circular buffers based on network consistency.

BRIEF DESCRIPTION OF THE DRAWINGS

Preferred embodiments of the present invention will now be described, by way of example only, with reference to the following drawings, in which.

DETAILED DESCRIPTION

Embodiments of the present invention recognize that services that manage a conference call can experience bandwidth congestion when packets travel through intermediary networks with low throughput or high jitter ratios. In those scenarios, portions of audio can be lost (i.e., dropped) from the broadcast during the meeting. In other words, portions of the audio from a user cannot be heard from other members in the meeting. As such, embodiments of the present invention recognize these problems and provide solutions for dynamically preventing audio dropout in a seamless manner such that members of the meeting will not notice packet loss that causes audio dropout. In this manner, as discussed in greater detail later in this Specification, embodiments of the present invention replicate output audio streams (e.g., voice streams) with sequential text words stored in circular buffers and identify missing audio packets on the receiving side (e.g., devices of user's connecting to a conference call and are listening to audio from a presenter of the meeting). Embodiments of the present invention can then reproduce missing audio segments associated with the identified missing audio packets, by injecting newly generated audio at appropriate points in time that replicate the speaker's (e.g., a user who is currently talking and producing audio) voice deriving missing words from the circular buffers.

Figure 1:
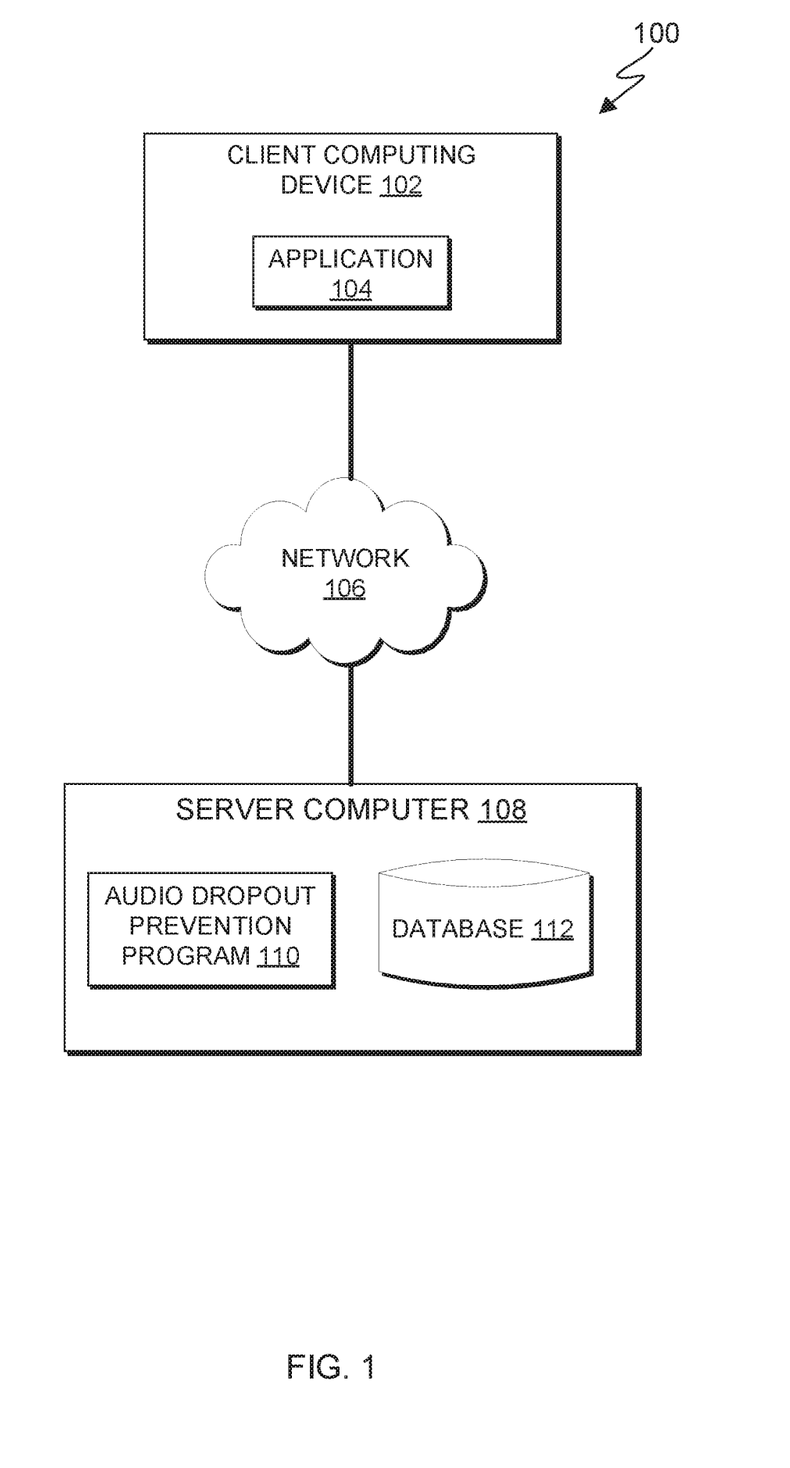
FIG. 1 depicts a block diagram of a computing environment, in accordance with an embodiment of the present invention.

FIG. 1 is a functional block diagram illustrating a computing environment, generally designated, computing environment 100, in accordance with one embodiment of the present invention. FIG. 1 provides only an illustration of one implementation and does not imply any limitations with regard to the environments in which different embodiments may be implemented. Many modifications to the depicted environment may be made by those skilled in the art without departing from the scope of the invention as recited by the claims.

Computing environment 100 includes client computing device 102 and server computer 108, all interconnected over network 106. Client computing device 102 and server computer 108 can be a standalone computer device, a management server, a webserver, a mobile computing device, or any other electronic device or computing system capable of receiving, sending, and processing data. In other embodiments, client computing device 102 and server computer 108 can represent a server computing system utilizing multiple computer as a server system, such as in a cloud computing environment. In another embodiment, client computing device 102 and server computer 108 can be a laptop computer, a tablet computer, a netbook computer, a personal computer (PC), a desktop computer, a personal digital assistance (PDA), a smart phone, or any programmable electronic device capable of communicating with various components and other computing devices (not shown) within computing environment 100. In another embodiment, client computing device 102 and server computer 108 each represent a computing system utilizing clustered computers and components (e.g., database server computers, application server computers, etc.) that act as a single pool of seamless resources when accessed within computing environment 100. In some embodiments, client computing device 102 and server computer 108 are a single device. Client computing device 102 and server computer 108 may include internal and external hardware components capable of executing machine-readable program instructions, as depicted and described in further detail with respect to FIG. 7.

In this embodiment, client computing device 102 is a user device associated with a user and includes application 104. Application 104 communicates with server computer 108 to access audio dropout prevention program 110 (e.g., using TCP/IP) to access content, user information, and database information. Application 104 can further communicate with audio dropout prevention program 110 to transmit instructions automatically prevent audio dropout, as discussed in greater detail with regard to FIGS. 2-6.

Network 106 can be, for example, a telecommunications network, a local area network (LAN), a wide area network (WAN), such as the Internet, or a combination of the three, and can include wired, wireless, or fiber optic connections. Network 106 can include one or more wired and/or wireless networks that are capable of receiving and transmitting data, voice, and/or video signals, including multimedia signals that include voice, data, and video information. In general, network 106 can be any combination of connections and protocols that will support communications among client computing device 102 and server computer 108, and other computing devices (not shown) within computing environment 100.

Server computer 108 is a digital device that hosts audio dropout prevention program 110 and database 112. In this embodiment, audio dropout prevention program 110 resides on server computer 108. In other embodiments, audio dropout prevention program 110 can have an instance of the program (not shown) stored locally on client computer device 102. In yet other embodiments, audio dropout prevention program 110 can be stored on any number or computing devices.

In this embodiment, audio dropout prevention program 110 dynamically prevents audio dropout in real time and avoids any delays in voice transmission by replicating output audio streams (e.g., voice streams) with sequential text words stored in circular buffers. Audio dropout prevention program 110 can then identify missing audio packets on that users listening to audio from the stored sequential text words stored in the circular buffer. Audio dropout prevention program 110 can then reproduce missing audio segments associated with the missing audio packets using the sequential text words stored in the circular buffer. In this embodiment, audio dropout prevention program 110 can then inject the reproduced missing audio segment (e.g., newly generated audio) at appropriate points in time that replicate the speaker's (e.g., a user who is currently talking and producing audio) voice. In this embodiment, audio dropout prevention program includes a speech to text module (not shown) and an audio packet constructor (not shown).

In this embodiment, audio dropout prevention program 110 can automatically prevent audio dropout when low network bandwidth is detected or predicted. In some embodiments, audio dropout prevention program 110 can be configured to be always "on" or be overridden to "off". Audio dropout prevention program 110 can also be set to trigger based on a static circular buffer size.

In this embodiment, audio dropout prevention program 110 routes detected audio to a conferencing service or application used by users and a copy of the audio to a speech to text module (STT module) that generates a textual representation of each spoken word and a sequence number that audio dropout prevention program 110 can use to track the order of words uttered. Audio dropout prevention program 110 can then store the textual representation of each spoken word and corresponding sequence number into a circular buffer (referenced herein as circular buffer A or a first circular buffer).

In this embodiment, audio dropout prevention program 110 can dynamically adjust the size of circular buffer A depending on a percentage of dropped packets. In other embodiments, the size of the circular buffer can be configured by a conferencing service or application. In this embodiment, audio dropout prevention program 110 can utilize additional input in determining the circular buffer size and text transmitting interval such that audio dropout prevention program 110 can evaluate context of established communication between users (e.g., different geographies, network bandwidths, and previous communication history) in real time.

In this embodiment, audio dropout prevention program 110 transmit, at period time intervals, a specific text word and its associated sequence number from circular buffer A along with the associated audio stream to the conferencing service. Embodiments of the present invention recognize that text data is more compact than audio data and thus, in this manner, audio dropout prevention program 110 adds minimal overhead to network traffic.

Audio dropout prevention program 110 can then act on the receiving system. As used herein, a receiving system refers to one or more user devices associated with respective users that are connected to a conference call (e.g., teleconference, web conference, online meeting, etc.) that has at least audio capabilities and is receiving audio stream from one or more other devices. For example, in a conference call with two users, user alpha and user beta, user alpha may be presenting (e.g., talking or otherwise generating audio). In this example, user beta and user beta's device is identified as the receiving system. Conversely, a broadcasting system as used herein refers to one or more user devices associated with respective users that are transmitting audio (e.g., transmitting audio associated with speech from a user). In this embodiment, a receiving system can become a broadcasting system when the receiving system begins transmitting audio. Conversely, a broadcasting system can become a receiving system when the broadcasting system ceases to transmit audio and begins receiving audio from another audio source.

In this embodiment, audio dropout prevention program 110 decodes received text and sequence data from the audio network packet received by the receiving system and stores it into a respective buffer for later use (e.g., referred herein as circular buffer B or a second circular buffer). In some embodiments, audio dropout prevention program 110 may send the text may be sent out of band using UDP or TCP to a different port.

In this embodiment, audio dropout prevention program 110 routes received and decoded audio to the speech to text (STT) module instead of routing the decoded audio directly to the soundcard for playback. In this way, audio dropout prevention program 110 can leverage the STT module to generate a textual representation of each spoken word detected in the audio stream on the receiver side along with a sequence number to keep track of the word order. In this embodiment, audio dropout prevention program 110 can then store the decoded words and the sequence number will be stored in a circular buffer (referred herein as circular buffer C or a third circular buffer).

Audio dropout prevention program 110 then determines whether there is potential for audio dropout. In this embodiment, audio dropout prevention program 110 determines whether there is a potential for audio dropout by comparing content stored on the circular buffers (e.g., compare content from circular buffer C and circular buffer B). In this embodiment, audio dropout prevention program 110 determines that there is no dropout if the word and sequence number are present and match both buffers. In other words, if the word and sequence number are present in bother buffers, audio dropout prevention program 110 determines that the audio is carrying a true representation of what was spoken. Accordingly, audio dropout prevention program 110 can then transmit the audio to the sound card and accordingly play back the audio to the user of the receiving system.

In this embodiment, audio dropout prevention program 110 determines that there is an audio dropout when a word is in circular buffer B but not in circular buffer C. In other words, audio dropout prevention program 110 has detected a word or portion of a word that is missing in that the receiving system (likely due to an experienced connection issue) and that the word was not detected (e.g., by the leveraged STT module).

In instances where audio dropout prevention program 110 determines that there is audio dropout (e.g., as identified by a missing word in circular buffer C), audio dropout prevention program 110 leverages the text to speech of the missing word stored in circular buffer B and uses the word stored in circular buffer B to recreate or otherwise use the audio stream associated with the missing word. In other words, audio dropout prevention program 110 uses text to speech (TTS) of this word (stored in circular buffer B) and play it in the audio stream sent to the receiving system instead of the distorted or unclear audio.

In this embodiment, audio dropout prevention program 110 can mimic a user's voice for enhanced realism. In this embodiment audio dropout prevention program 110 can mimic the speaker's voice by applying prerecorded audio of the user's speech.

In this embodiment, audio dropout prevention program 110 can undergo a training period. For example, audio prevention program 110 can use pre-conferencing testing of connections using simulated test phrases from all nodes. In this manner, audio dropout prevention program 110 can detect an attrition rate of each of the remote nodes. In some embodiments, audio prevention program 110 can allow for a manual override to be turned on or off. For example, in networks that have highly variable bandwidth, audio prevention program 110 can be left enabled even if the precheck bandwidth is higher than the threshold requirement for bandwidth. In other embodiments, audio dropout prevention program 110 can be set to trigger based on a static circular buffer size.

In alternative embodiments, audio dropout prevention program 110 can be integrated with an intelligent voice and sound analysis system for detecting the speaker's (e.g., user's) voice and audio stream characteristics (e.g., white noise, background noise, voice characteristics of the user, etc.). Audio dropout prevention program can be applied to transmit an enhanced audio stream with synthesized user's voice. In other embodiments, audio dropout prevention program 110 can be run against recorded meetings such that audio of the recorded meeting can be made accessible as non-interrupted, and clean audio stream for a previously recorded web meeting.

In yet other embodiments, audio dropout prevention program 110 can be configured to work with Real-time Transport Protocol (RTP). An RTP packet is a packet that can hold multiple or partial words. In this embodiment, audio dropout prevention program 110 can project or estimate the words to a respective packet by analyzing the packet size from headers of the packet.

In general, voice payload sizes range from 20 ms or 30 ms. Recognizing this, embodiments of the present invention recognize that most packets would contain partial words. Audio dropout prevention program 110 would send text on word boundaries. For example, a meeting participant can say "information is available on the intranet". Even if the word "information" takes one second to say (and at 20 ms packet size, about 50 audio packets to send), audio dropout prevention program 110 sends the text representation of it only once the leveraged STT on the sender's side has decoded the word (e.g., the word might be contained on packet 51 or so).

Audio dropout prevention program 110 continues to send this word with subsequent packets (for redundancy) until the next word (e.g., next word is "is") is decoded by the leveraged STT around ten packets later. Audio dropout prevention program 110 can then send that word until the next word is ready and so on and so forth.

On the receiving side, audio dropout prevention program 110 can leverage the STT to decode the audio stream. If audio dropout prevention program 110 did not decode the word "information" by the time audio dropout prevention program 110 receives packet 51 (e.g., which would indicate that text representation of the word "information"), audio dropout prevention program 110 can identify that the audio for this word is lost. Any prior sequential packets received after packet 51 (e.g., packets like 47, 48, and 49) would result in an out of sequence reconstruction and would lead to inaudible and incomprehensible speech. In this way, audio dropout prevention program 110 can confirm that it needs to insert the missing word via a TTS into the listener's stream.

In general, database 112 can be implemented using any non-volatile storage media known in the art. For example, database 112 can be implemented with a tape library, optical library, one or more independent hard disk drives, or multiple hard disk drives in a redundant array of independent disk (RAID). In this embodiment database 112 is stored on server computer 108.

Figure 2:
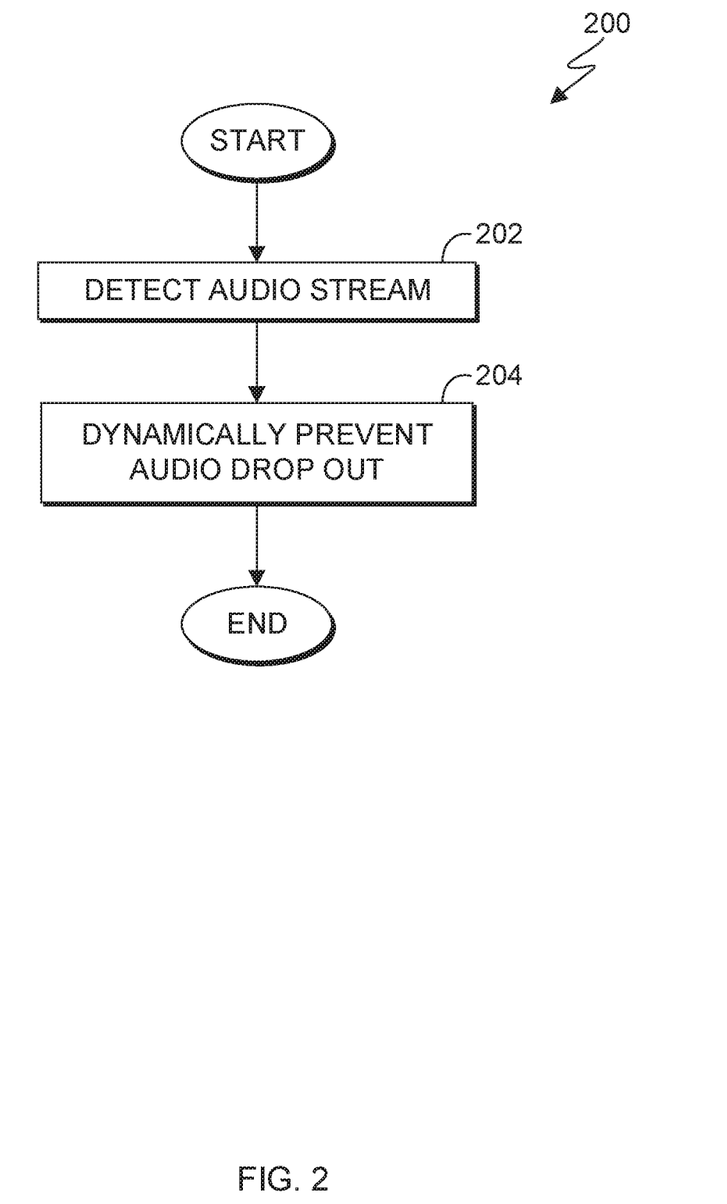
FIG. 2 is a flowchart depicting operational steps for preventing audio dropout, in accordance with an embodiment of the present invention.

FIG. 2 is a flowchart 200 depicting operational steps for automatically creating a link, in accordance with an embodiment of the present invention.

In step 202, audio dropout prevention program 110 detects an audio stream. In this embodiment, audio dropout prevention program 110 detects an audio stream by receiving input data (e.g., an audio stream) from client computing device 102. For example, audio dropout prevention program 110 can detect an person speaking and leverage conferencing software to process received audio. In other embodiments, audio dropout prevention program 110 can receive information from one or more other components of computing environment 100.

In this embodiment, an audio stream can come directly from a user device or can be received from a conferencing service via a network. In this embodiment, an audio stream refers to a live broadcast of audio information from a source (e.g., broadcasting system) via an audio interface, screen capture application, video camera, etc.

Figure 3:
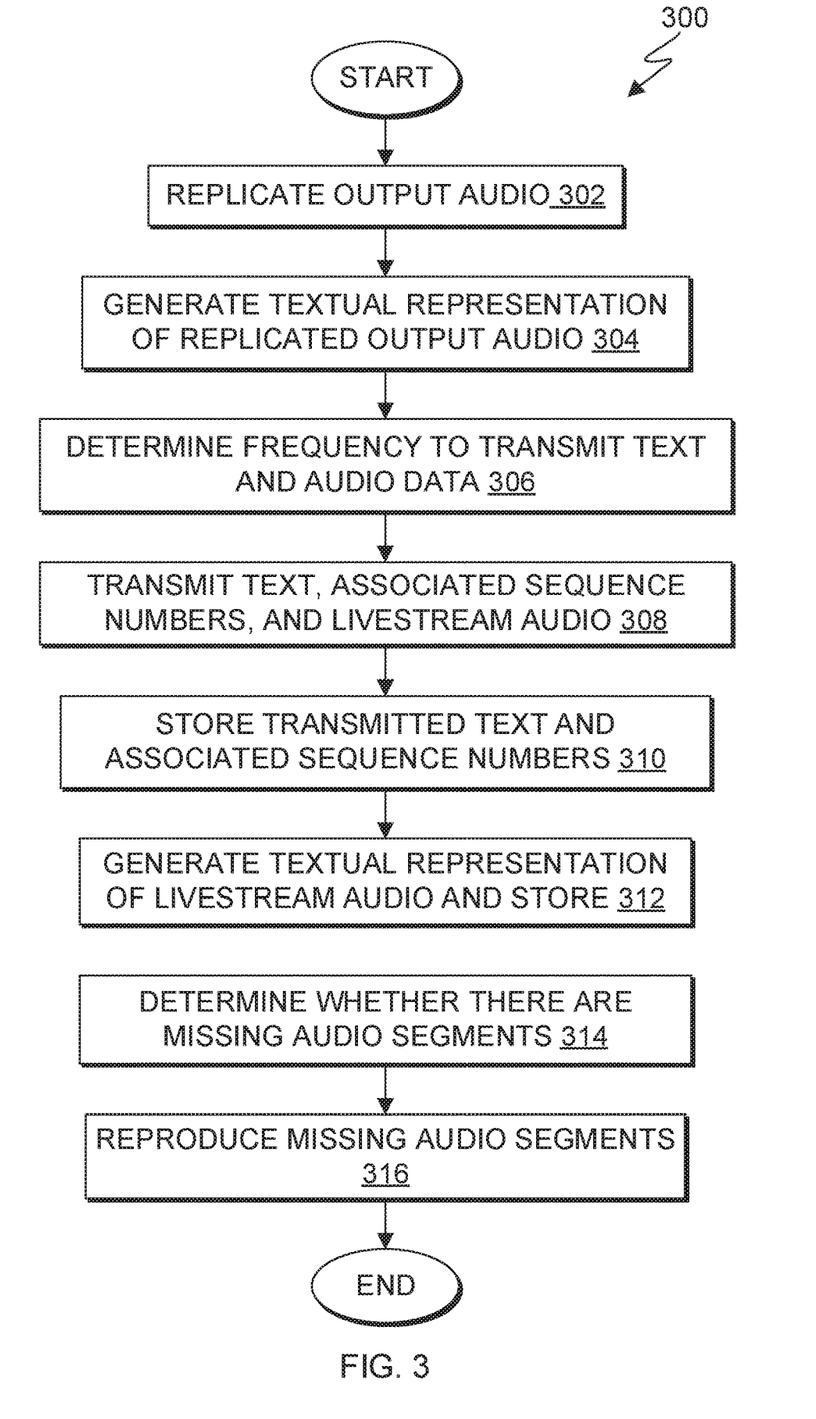
FIG. 3 is a flowchart depicting operational steps for replicating missing audio segments in real time, in accordance with an embodiment of the present invention.

In step 204, audio dropout prevention program 110 dynamically prevents audio dropout in real time and avoids any delays in voice transmission by replicating output audio streams (e.g., voice streams) with sequential text words stored in circular buffers as discussed in greater detail with regard to FIG. 3. For example, audio dropout prevention program 110 can replicate an audio stream and generate textual representations of the audio stream and associate each generated word of the audio stream with a sequence number. Audio dropout prevention program 110 can then transmit the generated textual representations, associated sequence numbers, and the live audio stream to a receiving system. Audio dropout prevention program 110 can then decode the transmitted generated textual representation and associated sequence numbers and store the generated textual representation and sequence numbers in another circular buffer. Instead of routing the decoded audio directly to the soundcard for playback, audio dropout prevention program 110 then leverages a speech to text module and store the generated text in yet another circular buffer. Audio dropout prevention program 110 can then identify whether there has is a potential dropout by comparing text stored in the circular buffers (e.g., circular buffer C as compared to circular buffer B). For example, if there is a word present in circular buffer B but missing from circular buffer C, audio dropout prevention program identifies the presence of a missing word as a potential drop out. Audio dropout prevention program 110 can then reproduce missing audio segments associated with the missing audio packets using the sequential text words stored in circular buffer B.

FIG. 3 is a flowchart 300 depicting operational steps for replicating missing audio segments in real time, in accordance with an embodiment of the present invention.

In step 302, audio dropout prevention program 110 replicates received output audio. In this embodiment, audio dropout prevention program 110 replicates the received output audio by making a copy of received audio. In this embodiment, audio dropout prevention program 110 can make a copy of the received audio with any copying service known in the art.

In step 304, audio dropout prevention program 110 generates a textual representation of the replicated output audio. In this embodiment, audio dropout prevention program 110 generates a textual representation of the replicated output audio by leveraging its STT module. Audio dropout prevention program 110 can then assign each detected word a corresponding sequence number. In this embodiment, audio dropout prevention program 110 uses a numerical sequence where greater values indicate a later sequence than lesser values (e.g., a sequence of five denotes a later point in time than a sequence number of four). Audio dropout prevention program 110 can then store each detected word along with its respective sequence number into a first circular buffer.

In step 306, audio dropout prevention program 110 determines a frequency with which to transmit text and audio data. In this embodiment, audio dropout prevention program 110 determines a frequency with which to transmit text and audio data (i.e., how often audio dropout prevention program 110 will send text data in addition to audio data) shown by the following formula, Formula 1 as shown below:

$$\text{Frequency of Transmission} = \frac{(TotalVP)}{RT}$$

where TotalVP denotes the total number of voice packets to transmit a word divided by a redundancy threshold.

Depending on the redundancy threshold (RT) and the number of packets per word, the system may include the sequence number and text data of the most recently added word in the first circular buffer (e.g., circular buffer A) in addition to transmitting the current voice data.

For example, if the current word being spoken is "information" and this takes 20 voice packets to send and the redundancy threshold (RT) is set to 2, then audio dropout prevention program 110 determines that the text packet should be sent once every 10 packets, ensuring that at least 2 text copies of the word arrive at the receiving end. This would ensure even if a user loses 50% of the packets, the missing audio word can still be reconstructed. In embodiments where audio dropout prevention program expects or estimates that the network to have even worse packet drop characteristics or audio dropout prevention program 110 determines it from missing sequence numbers in the circular buffer, audio dropout prevention program 110 can dynamically adjust the redundancy threshold (RT) to a higher value allowing improved audio resilience even to a high network packet loss.

In step 308, audio dropout prevention program 110 transmits generated text, associated sequence numbers, and livestream audio. In this embodiment, audio dropout prevention program 110 transmits generated text, associated sequence numbers, and livestream audio according to the frequency value determined in step 306 (e.g., via network 106 to another computing device not shown in FIG. 1).

In step 310, audio dropout prevention program 110 stores transmitted text and associated sequence numbers on the receiving system. In this embodiment, stores the transmitted text and associated sequence numbers on the receiving system into a second circular buffer (e.g., circular buffer B) for later use.

In this embodiment, audio dropout prevention program 110 can detect multiple packets coming in with the same sequence number. In these scenarios, audio dropout prevention program 110 continues storing each of the received multiple packets separately and can use each counted packet to calculate a redundancy detection threshold (RDT) values.

In this embodiment, the RDT will have two components: RDT_MIN which is the frequency within the circular buffer of the word and sequence number that has the fewest duplicates and RDT_MAX which is the frequency within the circular buffer of the word and sequence number that has the most duplicates. If RDT_MIN is less than one, the receiving system will request the sending system to increase (i.e., increment) its RT value by one. If RDT_MIN is greater than 2 for all words in the circular buffer and network consistency is high, then the receiving system will request the sending system to decrease its RT value by one.

In other embodiments, audio dropout prevention program 110 can be configured to automatically calculate a redundancy detection threshold and determine that if RDT_MIN is less than one, then audio dropout prevention program 110 can increase its redundancy threshold by one. Conversely, If RDT_MIN is greater than two, for all words in the circular buffer and network consistency is high, then audio dropout prevention program 110 can adjust the redundancy threshold (e.g., of the broadcasting system) by one.

In this embodiment, audio dropout prevention program 110 calculates network consistency using formula 2, as shown below:

$$NET_C = RDT_{MAX} - RDT_{MIN}$$

where NET_C represents network consistency, RDT_MAX is a frequency within the circular buffer of the word and sequence number that has the most duplicates, and RDT_MIN is a frequency within the circular buffer of the word and sequence number that has the fewest duplicates.

In this embodiment, if NET_C result is below 2 then the network consistency will be considered "high".

In step 312, audio dropout prevention program 110 generates a textual representation of the live stream audio and stores it into a third circular buffer (e.g., circular buffer C). In this embodiment, audio dropout prevention program 110 generates a textual representation of the live stream audio using its speech to text (STT) module instead of routing the decoded audio directly to the soundcard for playback. In this embodiment, audio dropout prevention program 110 leverages the STT module to generate a textual representation of each spoken word detected in the audio stream on the receiver side along with a sequence number to keep track of the word order. Audio dropout prevention program can then store the decoded words and the sequence number into the third circular buffer (e.g., circular buffer C).

In step 314, audio dropout prevention program 110 determines whether there are missing audio segments. In this embodiment, audio dropout prevention program 110 determines that there are missing audio segments by checking contents of the third circular buffer (e.g., circular buffer C) as compared to the second circular buffer (e.g., circular buffer B).

In this embodiment, audio dropout prevention program 110 determines that there are no missing audio segments (e.g., carries a true representation of what was spoken), if audio dropout prevention program 110 identifies that a word is present in both buffers and there are no missing sequence numbers in the second circular buffer (e.g., circular buffer B). Accordingly, audio dropout prevention program 110 can output the audio now directly to the sound card as nothing has to be reconstructed.

In this embodiment, audio dropout prevention program 110 determines that there are missing audio segments if audio dropout prevention program 110 identifies that a word is in the second circular buffer (e.g., circular buffer B) but not in the third circular buffer (e.g., circular buffer C) or that the word in the third circular buffer (e.g., circular buffer C) is truncated and not complete. In other words, audio dropout prevention program 110 concludes that the audio received on the receiving system may have experienced packet drops or other issues and the word or portion of the word was not detected.

In step 316, audio dropout prevention program 110 reproduces missing audio segments. In this scenario (e.g., where audio dropout prevention program detects there is missing audio), audio dropout prevention program 110 can reproduce missing audio segments by using, text to speech (TTS) to play this word in the audio stream using the corresponding missing word in the second circular buffer (e.g., circular buffer B). In this manner, audio dropout prevention program 110 can play the missing word at the specific time and have the generated audio stream playback seamlessly (by replacing the missing, distorted or unclear).

If audio dropout prevention program 110 detects the receiving system is missing audio and also is missing the text word in order to reconstruct the audio (which can be detected by a skipped sequence number in the second circular buffer, circular buffer B), audio dropout prevention program can request that the broadcasting system to increase its redundancy threshold (RT) value. In certain embodiments, audio dropout prevention program 110 can automatically increase the redundancy threshold value of the broadcasting system in response to detecting missing audio and missing the text word associated with the missing audio. In this embodiment, audio dropout prevention program 110 has a default increase of a value of one however, in some embodiments, audio dropout prevention program 110 can adjust this value depending on the number of missing sequence numbers. This will ensure that on the next transmission, the broadcasting system will send additional text copies of words so that even with a high rate of packet loss the audio can be successfully reconstructed In this embodiment, audio dropout prevention program 110 can recognize that in some cases there may be a slight delay introduced by the processing and injection of the audio, however this will be minimal and not as disruptive as having to ask the speaker to repeat again. In addition, audio dropout prevention program 110 can buffer any incoming audio following a missing word and allow playback of remaining audio at slightly higher playback speed (e.g., a default speed of 1.25×) allowing the listener's stream to catch up with the live audio stream after missing words that required audio reconstruction and injection.

Figure 4A:
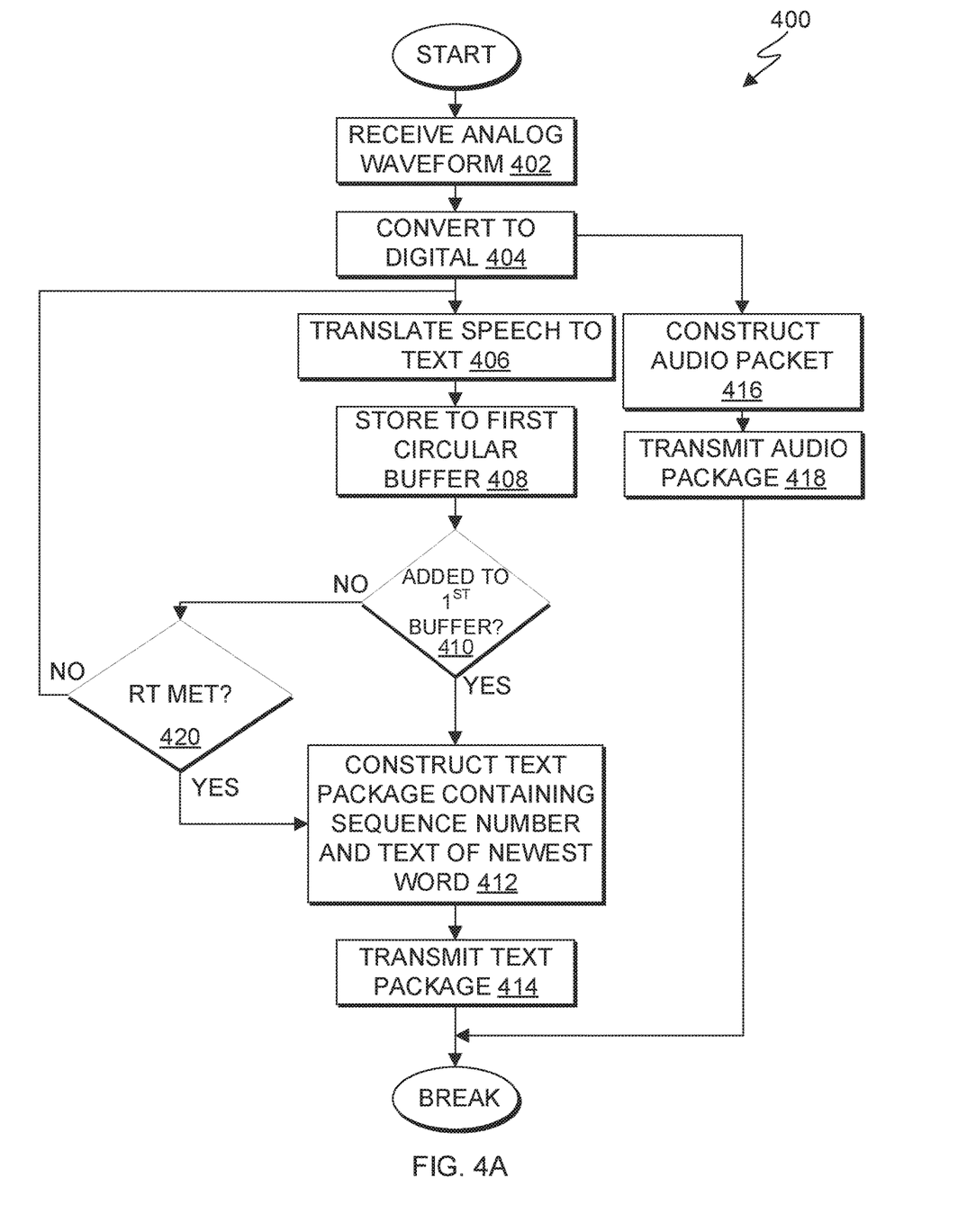
FIGS. 4A and 4B are flowcharts depicting alternate operational steps for replicating missing audio segments, in accordance with an embodiment of the present invention.
Figure 4B:
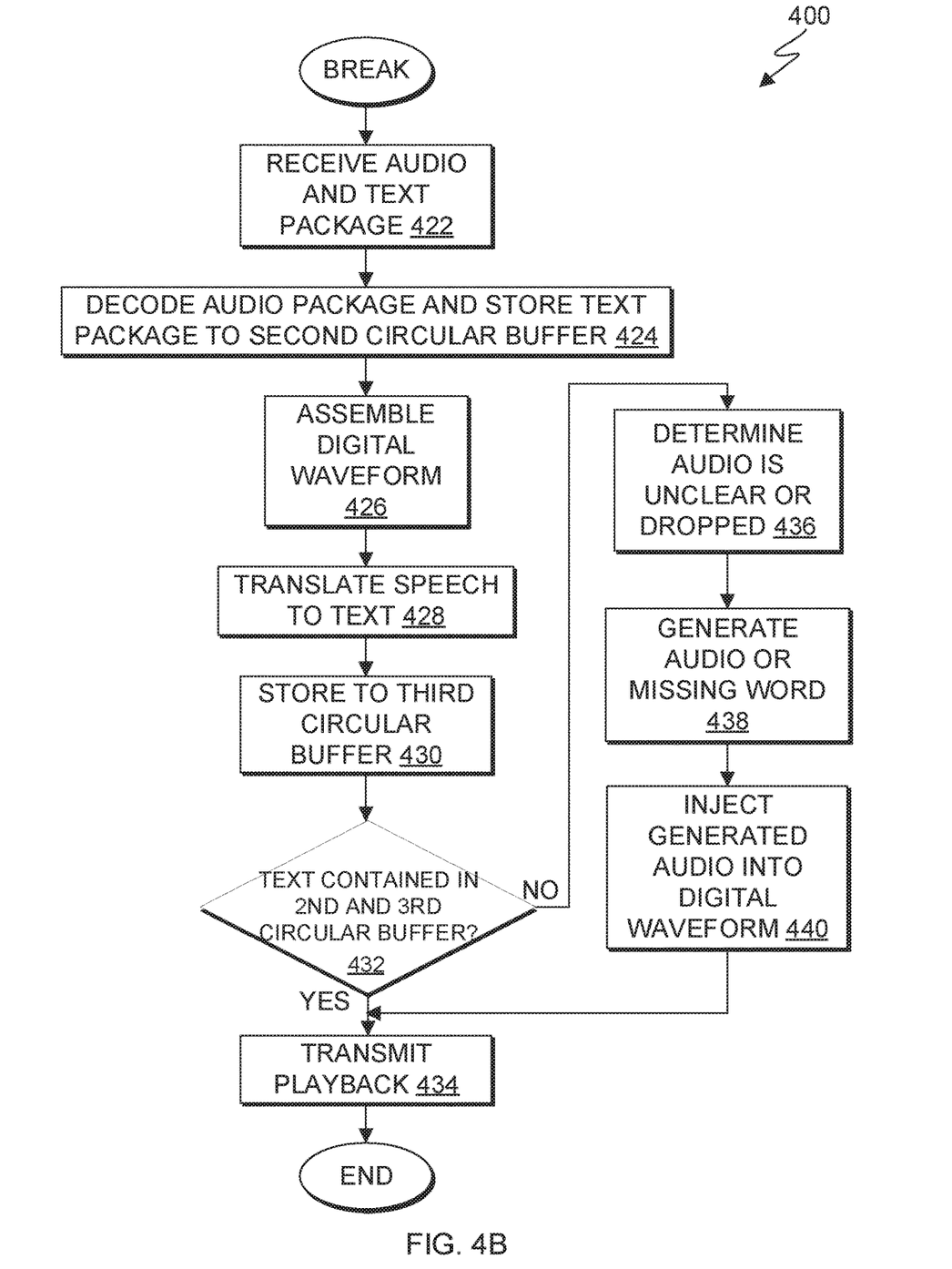

FIGS. 4A and 4B are depictions of a flowchart 400 that illustrate alternate operational steps for replicating missing audio segments, in accordance with an embodiment of the present invention.

FIG. 4A depicts operational steps of flowchart 400 performed by audio dropout prevention program 110 performed on a broadcasting system.

In step 402, audio dropout prevention program 110 receives audio in analog waveform. In this embodiment audio dropout prevention program 110 receives audio in analog waveform from computing computing device 102 (e.g., a broadcasting system). In other embodiments, audio dropout prevention program 110 can receive audio in analog waveform from one or more other components of computing environment 100 (not shown). For example, audio dropout prevention program 110 may receiving audio in analog form from a conferencing service. In other embodiments audio dropout prevention program 110 can receive audio in digital form.

In step 404, audio dropout prevention program 110 converts the received analog waveform audio to digital form. In this embodiment, audio dropout prevention program 110 converts received analog waveform audio to digital using an analog-to digital (ADC converter).

In step 406, audio dropout prevention program 110 translates speech to text. In this embodiment audio dropout prevention program 110 translates speech to text using a speech to text (STT) module. In this embodiment, audio dropout prevention program 110 can simultaneously assign each detected word of speech uttered in the converted digital output to a corresponding sequence number. For example, where a phrase contained in the audio file has been identified as "The next meeting will be tomorrow", audio dropout prevention program 110 can identify each word in the phrase and assign each word a corresponding sequence number (e.g., "the" is assigned a sequence number of 0001, "next" is assigned the sequence number of 0002, and so on).

In step 408, audio dropout prevention program 110 stores the translated text into the first circular buffer. In this embodiment audio dropout prevention program 110 stores the translated text into the first circular buffer on the broadcasting system.

In step 410, audio dropout prevention program 110 determines whether a new word is added to the first circular buffer. In this embodiment, audio dropout prevention program 110 determines whether a new word is added to the first circular buffer at a regular time interval.

If, in step 410, audio dropout prevention program 110 determines that a new word has been added to the first circular buffer, then, in step 412, audio dropout prevention program 110 constructs a text package containing a sequence number associated with the text of the newest word. In this embodiment, audio dropout prevention program constructs a text package that contains the new word and a respectively associated sequence number.

In step 414, audio dropout prevention program 110 transmits the constructed text package to a receiving system. In this embodiment, audio dropout prevention program 110 transmits the constructed text package to the receiving system via network 106.

If, in step 410, audio dropout prevention program 110 determine that a new word has not been added to the first circular buffer, then, in step 420, audio dropout prevention program 110 determines whether a redundancy threshold is met. In this embodiment, audio dropout prevention program 110 can reference an existing redundancy threshold of the broadcasting system. In other embodiments audio dropout prevention program 110 can dynamically adjust the redundancy threshold of the broadcasting system based on a redundancy detection threshold (RDT) values.

As previously described, the RDT will have two components: RDT_MIN which is the frequency within the circular buffer of the word and sequence number that has the fewest duplicates and RDT_MAX which is the frequency within the circular buffer of the word and sequence number that has the most duplicates. If RDT_MIN is less than one, the receiving system will request the sending system to increase its RT value by one. If RDT_MIN is greater than 2 for all words in the circular buffer and network consistency is high, then the receiving system will request the sending system to decrease its RT value by one.

If, in step 420, audio dropout prevention program 110 determines that a redundancy threshold is not met, then processing proceeds iteratively to step 406.

In step 416, audio dropout prevention program 110 constructs audio packets for segments of the converted digital audio. In this embodiment step 416 is done concurrently with step 406 (after audio dropout prevention program 110 converts analog audio to a digital form. In this embodiment, audio dropout prevention program 110 constructs audio packets for each detected word.

In step 418, audio dropout prevention program 110 transmits the constructed audio packet. In this embodiment, audio dropout prevention program 110 transmits the audio package containing constructed one or more audio packets.

FIG. 4B depicts operational steps that continue flowchart 400 performed by audio dropout prevention program 110 performed on a receiving system.

In step 422, audio dropout prevention program 110 receives the transmitted text package of step 414 and the transmitted audio package of step 418. In this embodiment, audio dropout prevention program 110 receives the transmitted text package and audio package via a network (e.g., network 106).

In step 424, audio dropout prevention program 110 decodes the audio package and text package and stores the text package to a second circular buffer. In this embodiment, audio dropout prevention program 110 decodes the audio package but does not immediate transmit (i.e., route) the decoded audio directly to the soundcard for playback. In this embodiment, audio dropout prevention program 110 stores the text package into the second circular buffer on the receiving system.

In step 426, audio dropout prevention program 110 assembles the decoded audio package into digital waveform. In embodiments where audio dropout prevention program 110 decodes analog waveforms from the broadcasting system, audio dropout prevention program 110 converts the analog waveform into digital output.

In step 428, audio dropout prevention program 110 translate speech to text. In this embodiment audio dropout prevention program 110 translates speech to text using a speech to text (STT) module. In this embodiment, audio dropout prevention program 110 can simultaneously assign each detected word of speech uttered in the converted digital output to a corresponding sequence number.

In step 430, audio dropout prevention program 110 stores the translated speech to text to a third circular buffer. In this embodiment, audio dropout prevention program 110 stores the translated speech to text to the third circular buffer stored on the receiving system.

In step 432, audio dropout prevention program 110 determines whether text contained in the second circular buffer is contained in the third circular buffer. In this embodiment, audio dropout prevention program 110 whether text contained in the second circular buffer is contained in the third circular buffer to identify if there are missing audio segments. In other words, audio dropout prevention program 110 determines that there are missing audio segments if audio dropout prevention program 110 identifies that a word is in the second circular buffer (e.g., circular buffer B) but not in the third circular buffer (e.g., circular buffer C) or that the word in the third circular buffer (e.g., circular buffer C) is truncated and not complete. In other words, audio dropout prevention program 110 concludes that the audio received on the receiving system may have experienced packet drops or other issues and the word or portion of the word was not detected.

If, in step 432, audio dropout prevention program 110 determines that text contained in the second circular buffer is contained in the third circular buffer, then, in step 434, audio dropout prevention program 110 transmit the audio to a soundcard of the receiving system to playback of the audio.

If, in step 432, audio dropout prevention program 110 determines that text contained in the second circular buffer is not contained in the third circular buffer, then, in step 436 audio dropout prevention program 110 determines that the audio is unclear or dropped. In this embodiment, audio dropout prevention program 110 concludes that the audio received on the receiving system may have experienced packet drops or other issues and the word or portion of the word was not detected when text contained in the second circular buffer is not contained in the third circular buffer.

In step 438. audio dropout prevention program 110 generates audio or missing word. In this embodiment, audio dropout prevention program 110 can reproduce missing audio segments by using, text to speech (TTS) to play this word in the audio stream using the corresponding missing word in the second circular buffer (e.g., circular buffer B).

In step 440, audio dropout prevention program 110 injects the generated audio digital waveform. In this embodiment, audio dropout prevention program 110 uses the sequence number associated with the generated word to identify the appropriate to inject the generated audio. In this manner, audio dropout prevention program 110 can play the missing word at the specific time and have the generated audio stream playback seamlessly (by replacing the missing, distorted or unclear).

Processing then continues at step 434, where audio dropout prevention program 110 can then transmit the audio to a soundcard of the receiving system to playback of the audio.

Figure 5A:
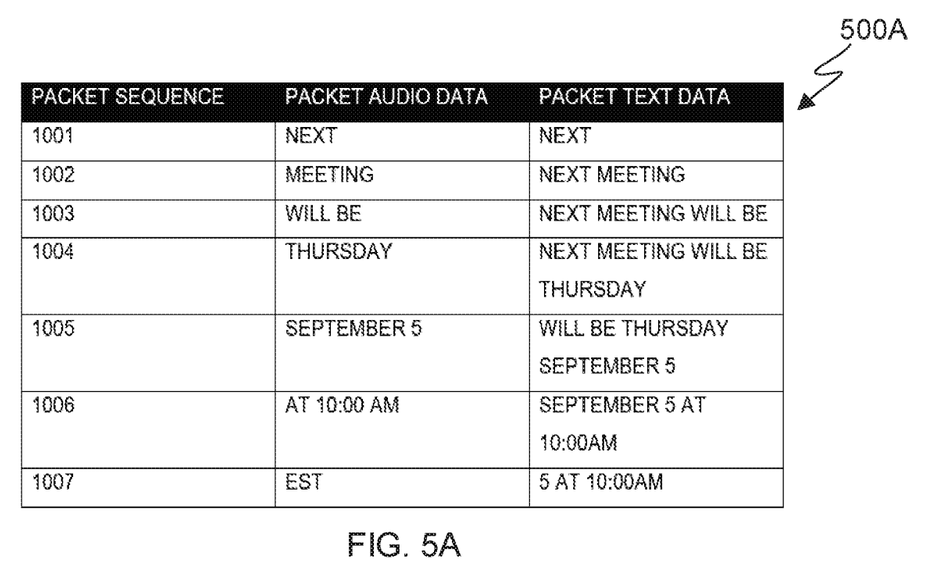
FIGS. 5A-C are example tables that illustrate values used to detect a potential audio dropout, in accordance with an embodiment of the present invention.
Figure 5B:
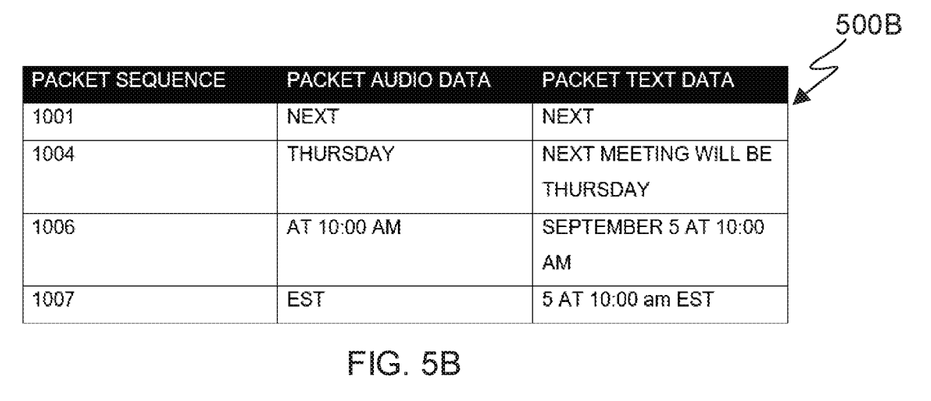
Figure 5C:
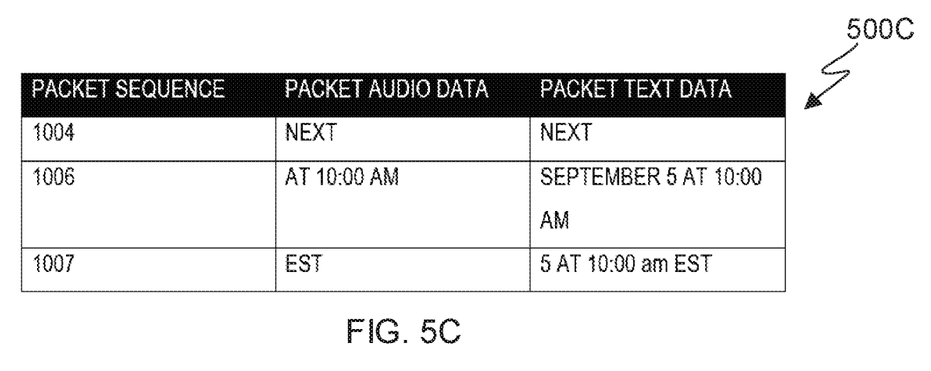

FIGS. 5A-C are example tables that illustrate values used to detect a potential audio dropout, in accordance with an embodiment of the present invention.

In this example, Users A, B, and C are in a conference call. User A is using the broadcasting system and generates a live stream. User B and User C each experience connection issues. Audio dropout program 110 has taken steps described in flowcharts 2 through 4 to prevent audio dropout.

Audio dropout prevention program 110 has created a redundant text stream of the text chunks from the audio data generated by User A. Audio dropout program 110 has generated Table 500A and depicts text packets that are sequentially number from 1001 through 1007. In this example, audio dropout program 110 has estimated the chunk size based on the network bandwidth characteristics.

In this example, audio dropout prevention program 110 detects that User B has experienced some of the audio packet loss about half the audio packets as compared between Table 500B (associated with User B) and Table 500C (associated with User C). In this example, audio dropout prevention program 110 can estimate the duration and identifies audio segment boundaries in received packets by both User B and User C, respectively. Audio dropout prevention program 110 generates the following text from the identified audio segment: "Next Thursday at 10:00 AM EST".

Audio dropout prevention program 110 can then compare the generated text with complete utterances of text delivered in text packets 1001 through 1107 in Table A and identify missing audio packets 1002, 1003, and 1005. Audio dropout prevention program 110 can then reconstruct the text content based on the text packet 1004 which contains the text data "next meeting will be "Thursday" and packet 1005" "will be Thursday September 5". In this way, audio dropout prevention program 110 reconstructs text content for missing audio to say, "next meeting will be Thursday September 5.

Audio dropout prevention program 110 can then leverage the text to speech module to produce an audio snippet of the reconstructed text phrase of "meeting will be" and "September 5" by stitching in produced audio snippets so that the message (e.g., entire utterance/phrase) broadcasted and heard by User B is "Next meeting will be Thursday, September 5 at 10:00 AM EST."

Similarly, audio dropout prevention program 110 produces an audio snippet of the reconstructed phrase "Next meeting will be" and "September 5" so that the message "Next meeting will be Thursday, September 5 at 10:00 AM EST" will be broadcasted to User C.

Figure 6:
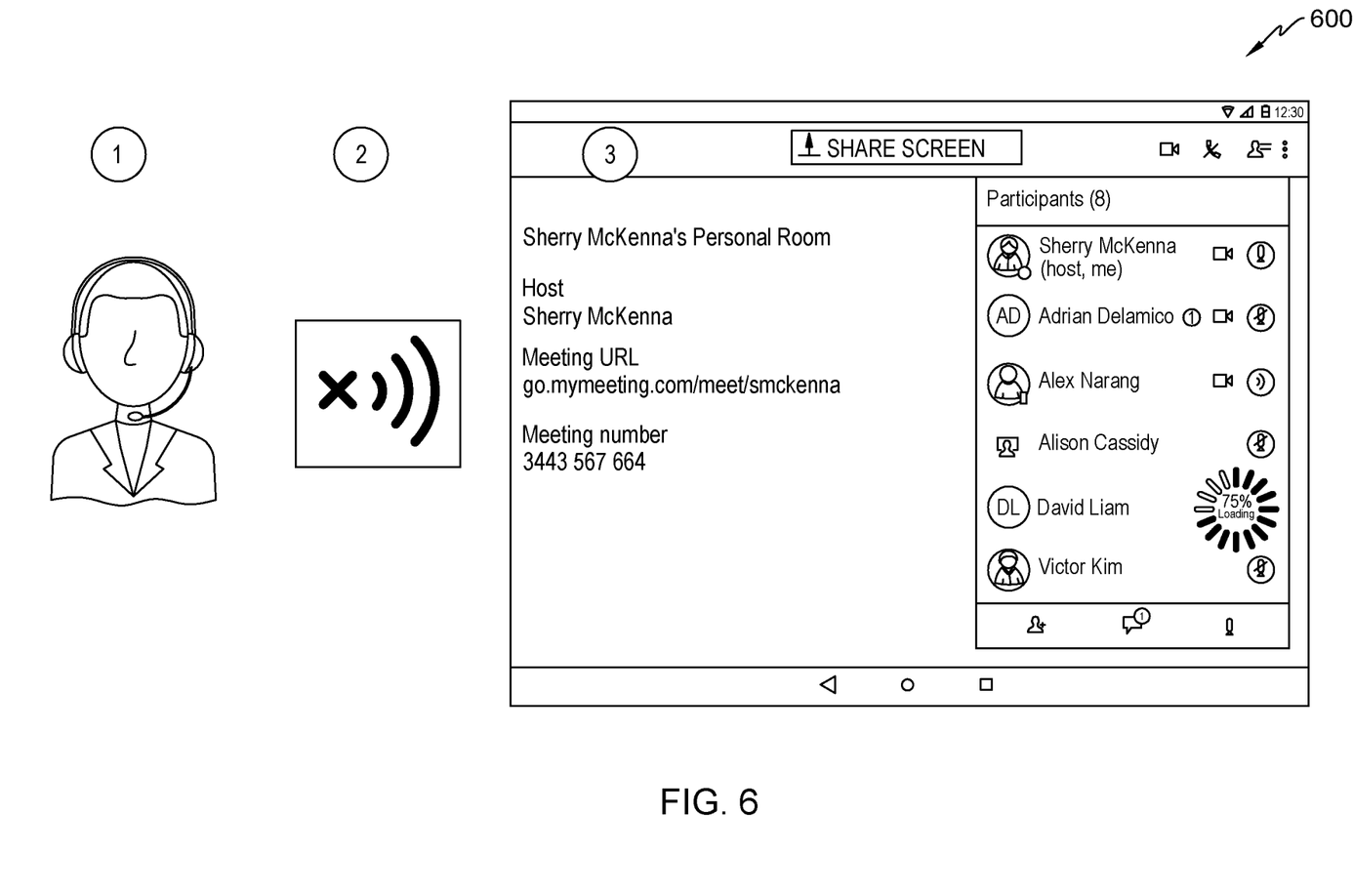
FIG. 6 is an example generated user interface that can alert a user to audio dropouts experienced by members during a conference call, in accordance with an embodiment of the present invention.

FIG. 6 is an example generated user interface 600 that can alert a user to audio dropouts experienced by members during a conference call, in accordance with an embodiment of the present invention.

In this example a user (e.g., David Liam) calls in to a web meeting and is presenting. Audio dropout prevention program 110 detects low bandwidth of the user calling in and triggers smart caching features (e.g., using the circular buffers and STT and TTS modules). In this example, audio dropout prevention program transmits text along with audio data and recreates audio data on the receiving side using the user's synthesized voice. In this example, audio dropout prevention program 110 can indicate that the user's voice is being buffered by generating a graphic icon that denotes buffering that is placed beside the user's avatar.

Figure 7:
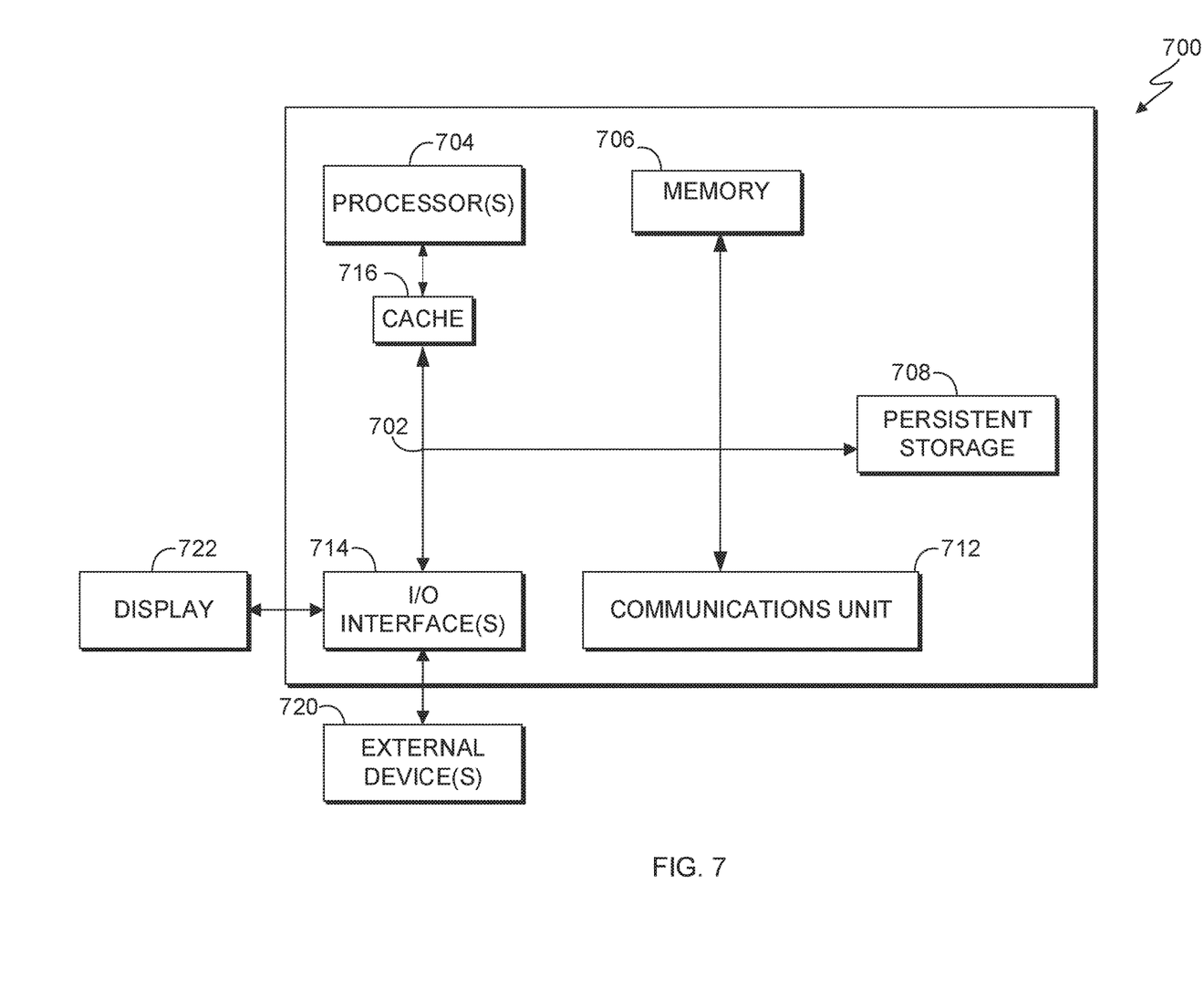
FIG. 7 is a block diagram of an example system, in accordance with an embodiment of the present invention.

FIG. 7 depicts a block diagram of components of computing systems within computing environment 100 of FIG. 1, in accordance with an embodiment of the present invention. It should be appreciated that FIG. 7 provides only an illustration of one implementation and does not imply any limitations with regard to the environments in which different embodiments can be implemented. Many modifications to the depicted environment can be made.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

Computer system 700 includes communications fabric 702, which provides communications between cache 716, memory 706, persistent storage 708, communications unit 712, and input/output (I/O) interface(s) 714. Communications fabric 702 can be implemented with any architecture designed for passing data and/or control information between processors (such as microprocessors, communications and network processors, etc.), system memory, peripheral devices, and any other hardware components within a system. For example, communications fabric 702 can be implemented with one or more buses or a crossbar switch.

Memory 706 and persistent storage 708 are computer readable storage media. In this embodiment, memory 706 includes random access memory (RAM). In general, memory 706 can include any suitable volatile or non-volatile computer readable storage media. Cache 716 is a fast memory that enhances the performance of computer processor(s) 704 by holding recently accessed data, and data near accessed data, from memory 706.

Audio dropout prevention program 110 (not shown) may be stored in persistent storage 708 and in memory 706 for execution by one or more of the respective computer processors 704 via cache 716. In an embodiment, persistent storage 708 includes a magnetic hard disk drive. Alternatively, or in addition to a magnetic hard disk drive, persistent storage 708 can include a solid state hard drive, a semiconductor storage device, read-only memory (ROM), erasable programmable read-only memory (EPROM), flash memory, or any other computer readable storage media that is capable of storing program instructions or digital information.

The media used by persistent storage 708 may also be removable. For example, a removable hard drive may be used for persistent storage 708. Other examples include optical and magnetic disks, thumb drives, and smart cards that are inserted into a drive for transfer onto another computer readable storage medium that is also part of persistent storage 708.

Communications unit 712, in these examples, provides for communications with other data processing systems or devices. In these examples, communications unit 712 includes one or more network interface cards. Communications unit 710 may provide communications through the use of either or both physical and wireless communications links. Audio dropout prevention program 110 may be downloaded to persistent storage 708 through communications unit 712.

I/O interface(s) 714 allows for input and output of data with other devices that may be connected to client computing device and/or server computer. For example, I/O interface 714 may provide a connection to external devices 720 such as a keyboard, keypad, a touch screen, and/or some other suitable input device. External devices 720 can also include portable computer readable storage media such as, for example, thumb drives, portable optical or magnetic disks, and memory cards. Software and data used to practice embodiments of the present invention, e.g., audio dropout prevention program 110, can be stored on such portable computer readable storage media and can be loaded onto persistent storage 708 via I/O interface(s) 714. I/O interface(s) 714 also connect to a display 722.

Display 722 provides a mechanism to display data to a user and may be, for example, a computer monitor.

The present invention may be a system, a method, and/or a computer program product. The computer program product may include a computer readable storage medium (or media) having computer readable program instructions thereon for causing a processor to carry out aspects of the present invention.

The computer readable storage medium can be any tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, a special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, a segment, or a portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A computer-implemented method comprising:
 detecting an audio stream comprising one or more voice data packets of a first computing system;

based on detecting the audio stream, dynamically preventing audio drop out on a second computing system using circular buffers based on network consistency; and wherein dynamically preventing audio drop out on the second computing system comprises:

generating a textual representation of the audio stream, the generated textual representation comprising text representations of spoken words in the audio stream and respective sequence numbers assigned to the text representations; and determining a frequency of transmission indicative of how often to send text data of the textual representation in addition to audio data of the audio stream, wherein for a spoken word in the audio stream, the frequency of transmission of the respective text data is determined relative to a total number of voice data packets to transmit the spoken word divided by a redundancy threshold.

2. The computer-implemented method of claim 1, wherein dynamically preventing audio drop out on a second computing system further comprises:

replicating a copy of the audio stream;

generating the textual representation of the replicated copy of the audio stream and storing the generated textual representation into a first circular buffer, wherein the generated textual representation comprises each spoken word and an associated sequence number assigned to each spoken word; and transmitting the textual representation and the audio stream at the determined frequency of transmission to a receiving system.

3. The computer-implemented method of claim 2, further comprising:

storing the transmitted textual representation from replicated copy of the audio stream into a second circular buffer on the receiving system; and generating a textual representation of the audio stream at the receiving system and storing the generated textual representation into a third circular buffer on the receiving system.

4. The computer-implemented method of claim 3, further comprising:

determining whether there are missing audio segments from the audio stream; and reproducing missing audio segments from the audio stream using the second circular buffer and the third circular buffer.

5. The computer-implemented method of claim 4, wherein determining whether there are missing audio segments from the audio stream comprises:

determining that there is one or more words associated with a segment present in the second circular buffer that is not present in the third circular buffer.

6. The computer-implemented method of claim 4, wherein reproducing missing audio segments from the audio stream using the second circular buffer and the third circular buffer comprises:

replacing a missing segment from the third circular buffer with a corresponding segment in the second circular buffer.

7. The computer-implemented method of claim 3, further comprising:

calculating a redundancy detection threshold value comprising a frequency within the third circular buffer of the word and sequence number that has a fewest number of duplicates and the frequency within the third circular buffer of the word and sequence number that has a most number of duplicates;

in response to the frequency within the third circular buffer of the word and sequence number that has the fewest duplicates is less than one, incrementing a redundancy value by one; and in response to the frequency within the third circular buffer of the word and sequence number that has the fewest duplicates is greater than two, decreasing the redundancy value by one.

8. The computer-implemented method of claim 7, further comprising:

determining network consistency for a network that connects the first computing system and the second computing system by subtracting the frequency within the third circular buffer of the word and sequence number that has the fewest number of duplicates from the frequency within the third circular buffer of the word and sequence number that has the most number of duplicates.

9. A computer program product comprising:

one or more computer readable storage media and program instructions stored on the one or more computer readable storage media, the program instructions comprising:

program instructions to detect an audio stream comprising one or more voice data packets of a first computing system;

program instructions that, based on detecting the audio stream, dynamically prevent audio drop out on a second computing system using circular buffers based on network consistency; and wherein dynamically preventing audio drop out on the second computing system comprises:

generating a textual representation of the audio stream, the generated textual representation comprising text representations of spoken words in the audio stream and respective sequence numbers assigned to the text representations; and determining a frequency of transmission indicative of how often to send text data of the textual representation in addition to audio data of the audio stream, wherein for a spoken word in the audio stream, the frequency of transmission of the respective text data is determined relative to a total number of voice data packets to transmit the spoken word divided by a redundancy threshold.

10. The computer program product of claim 9, wherein the program instructions to dynamically prevent audio drop out on a second computing system further comprise:

program instructions to replicate a copy of the audio stream;

program instructions to generate the textual representation of the replicated copy of the audio stream and store the generated textual representation into a first circular buffer, wherein the generated textual representation comprises each spoken word and an associated sequence number assigned to each spoken word; and program instructions to transmit the textual representation and the audio stream at the determined frequency of transmission to a receiving system.

11. The computer program product of claim 10, wherein the program instructions stored on the one or more computer readable storage media further comprise:
   program instructions to store the transmitted textual representation from replicated copy of the audio stream into a second circular buffer on the receiving system; and
   program instructions to generate a textual representation of the audio stream at the receiving system and storing the generated textual representation into a third circular buffer on the receiving system.

12. The computer program product of claim 11, wherein the program instructions stored on the one or more computer readable storage media further comprise:
   program instructions to determine whether there are missing audio segments from the audio stream; and
   program instructions to reproduce missing audio segments from the audio stream using the second circular buffer and the third circular buffer.

13. The computer program product of claim 11, wherein the program instructions to determine whether there are missing audio segments from the audio stream comprise:
   program instructions to determine that there is one or more words associated with a segment present in the second circular buffer that is not present in the third circular buffer.

14. The computer program product of claim 12, wherein the program instructions to reproduce missing audio segments from the audio stream using the second circular buffer and the third circular buffer comprise:
   program instructions to replace a missing segment from the third circular buffer with a corresponding segment in the second circular buffer.

15. A computer system for comprising:
   one or more computer processors;
   one or more computer readable storage media; and
   program instructions stored on the one or more computer readable storage media for execution by at least one of the one or more computer processors, the program instructions comprising:
      program instructions to detect an audio stream comprising one or more voice data packets of a first computing system;
      program instructions that, based on detecting the audio stream, dynamically prevent audio drop out on a second computing system using circular buffers based on network consistency; and
      wherein dynamically preventing audio drop out on the second computing system comprises:
         generating a textual representation of the audio stream, the generated textual representation comprising text representations of spoken words in the audio stream and respective sequence numbers assigned to the text representations; and
         determining a frequency of transmission indicative of how often to send text data of the textual representation in addition to audio data of the audio stream, wherein for a spoken word in the audio stream, the frequency of transmission of the respective text data is determined relative to a total number of voice data packets to transmit the spoken word divided by a redundancy threshold.

16. The computer system of claim 15, wherein the program instructions to dynamically prevent audio drop out on a second computing system further comprise:
   program instructions to replicate a copy of the audio stream;
   program instructions to generate the textual representation of the replicated copy of the audio stream and store the generated textual representation into a first circular buffer, wherein the generated textual representation comprises each spoken word and an associated sequence number assigned to each spoken word; and
   program instructions to transmit the textual representation and the audio stream at the determined frequency of transmission to a receiving system.

17. The computer system of claim 16, wherein the program instructions stored on the one or more computer readable storage media further comprise:
   program instructions to store the transmitted textual representation from replicated copy of the audio stream into a second circular buffer on the receiving system; and
   program instructions to generate a textual representation of the audio stream at the receiving system and storing the generated textual representation into a third circular buffer on the receiving system.

18. The computer system of claim 17, wherein the program instructions stored on the one or more computer readable storage media further comprise:
   program instructions to determine whether there are missing audio segments from the audio stream; and
   program instructions to reproduce missing audio segments from the audio stream using the second circular buffer and the third circular buffer.

19. The computer system of claim 17, wherein the program instructions to determine whether there are missing audio segments from the audio stream comprise:
   program instructions to determine that there is one or more words associated with a segment present in the second circular buffer that is not present in the third circular buffer.

* * * * *